(12) United States Patent
Xie (10) Patent No.: US 12,326,198 B2
(45) Date of Patent: Jun. 10, 2025

(54) INTEGRATION BOX AND PNEUMATIC HIGH VACUUM FLAPPER VALVE

(71) Applicant: MILO INNOVATION (SHENZHEN) CO., LTD., Shenzhen (CN)

(72) Inventor: Shiping Xie, Shenzhen (CN)

(73) Assignee: MILO INNOVATION (SHENZHEN) CO., LTD., Shenzhen (CN)

( * ) Notice: Subject to any disclaimer, the term of this patent is extended or adjusted under 35 U.S.C. 154(b) by 226 days.

(21) Appl. No.: 18/041,848

(22) PCT Filed: Dec. 30, 2021

(86) PCT No.: PCT/CN2021/142873
§ 371 (c)(1),
(2) Date: Feb. 16, 2023

(87) PCT Pub. No.: WO2022/156503
PCT Pub. Date: Jul. 28, 2022

(65) Prior Publication Data
US 2023/0313899 A1    Oct. 5, 2023

(30) Foreign Application Priority Data
Jan. 21, 2021 (CN) .......................... 202110081671.5

(51) Int. Cl.
*F16K 27/02* (2006.01)
*F16K 31/06* (2006.01)
(Continued)

(52) U.S. Cl.
CPC ........ *F16K 27/029* (2013.01); *F16K 31/0655* (2013.01); *F16K 37/0033* (2013.01); *F16K 49/00* (2013.01); *F16K 51/02* (2013.01)

(58) Field of Classification Search
CPC .... F16K 31/122; F16K 31/06; F16K 31/1221; F16K 31/0655; F16K 27/00;
(Continued)

(56) References Cited

U.S. PATENT DOCUMENTS 3,923,282 A * 12/1975 Henzler .................. F16K 41/10
251/63.4
4,070,001 A * 1/1978 Musgrove ............... F16K 51/02
137/907
(Continued)

FOREIGN PATENT DOCUMENTS

| CN | 101614283 A | 12/2009 |
|----|-------------|---------|
| CN | 203036045 U | 7/2013 |

(Continued)

OTHER PUBLICATIONS

International Search Report and Written Opinion issued in corresponding PCT Application No. PCT/CN2021/142873, dated Feb. 23, 2022.

Primary Examiner — Craig M Schneider
Assistant Examiner — Andrew J Rost
(74) Attorney, Agent, or Firm — Westbridge IP LLC (57) ABSTRACT

Disclosed are an integration box and a pneumatic high vacuum flapper valve, including a box body and a cover plate covering the box body. An integration box chamber is formed between the box body and the cover plate, a solenoid valve and a sensor assembly are provided in the integration box chamber, one side of the integration box is provided with a through hole, an integration box air inlet pipeline and an integration box air outlet pipeline, the solenoid valve is communicated with an outside air respectively through the integration box air inlet pipeline and the integration box air outlet pipeline, an external trigger signal is sensed by the sensor assembly by the through hole, and an electrical (Continued)

connector is provided on the other side of the integration box for electrical connection of the solenoid valve and the sensor assembly with the outside.

8 Claims, 11 Drawing Sheets

(51) Int. Cl.
    *F16K 37/00*         (2006.01)
    *F16K 49/00*         (2006.01)
    *F16K 51/02*         (2006.01)

(58) Field of Classification Search
    CPC ............... F16K 27/029; F16K 37/0041; F16K 37/0033; F16K 51/02; F16K 49/00
    See application file for complete search history.

(56) References Cited

U.S. PATENT DOCUMENTS

| | | | |
|---|---|---|---|
| 5,172,722 A * | 12/1992 | Nishimura | F16K 39/024 137/601.13 |
| 5,848,608 A * | 12/1998 | Ishigaki | F16K 41/10 251/60 |
| 6,508,268 B1 * | 1/2003 | Kouketsu | F16K 51/02 137/488 |
| 6,874,537 B2 * | 4/2005 | Hayashi | F15B 13/0857 137/884 |
| 9,267,614 B2 * | 2/2016 | Yamada | F16K 27/02 |
| 10,989,326 B2 * | 4/2021 | Rehhoff | F16K 31/124 |
| 2003/0222234 A1 * | 12/2003 | Filkovski | F16K 31/124 251/30.01 |
| 2012/0153193 A1 * | 6/2012 | Gu | F16K 51/02 251/28 |
| 2014/0130876 A1 | 5/2014 | Gu et al. | |
| 2015/0285382 A1 | 10/2015 | Kienreich et al. | |
| 2017/0328489 A1 * | 11/2017 | Beck | F16K 37/005 |
| 2018/0038509 A1 * | 2/2018 | Heimroth | F16K 37/0033 |

FOREIGN PATENT DOCUMENTS

| | | |
|---|---|---|
| CN | 110630757 A | 12/2019 |
| CN | 111895100 A | 11/2020 |
| CN | 214743668 U | 11/2021 |
| DE | 69511567 T2 | 12/1999 |

* cited by examiner

INTEGRATION BOX AND PNEUMATIC HIGH VACUUM FLAPPER VALVE

CROSS-REFERENCE TO RELATED APPLICATIONS

This application is the National Stage of International Application No. PCT/CN2021/142873, filed on Dec. 30, 2021, which claims priority to Chinese Patent Application No. 202110081671.5, filed on Jan. 21, 2021, the entire contents of which are incorporated herein by reference.

TECHNICAL FIELD

The present disclosure relates to the technical field of vacuum valves, and in particular to an integration box and a pneumatic high vacuum flapper valve.

BACKGROUND

The pneumatic high vacuum flapper valve is a very mature product, which is widely used in the high vacuum valve industry. In the actual application, the solenoid valve and the sensor in the high vacuum flapper valve are easy to fail. When the pneumatic high vacuum flapper valve fails, it is difficult for the user to judge whether the solenoid valve or the sensor assembly fails, and the replacement of the solenoid valve and sensor assembly is inconvenient, so the manufacturer needs to send professional after-sales personnel to troubleshoot and replace the parts on site where the pneumatic high vacuum flapper valve is used. Although the cost of the solenoid valve and sensor assembly is relatively low, the travel expenses of the after-sales personnel are relatively high, and at the same time, it leads to the relatively long downtime for customers and increases maintenance costs.

SUMMARY

The main objective of the present disclosure is to provide an integration box and a pneumatic high vacuum flapper valve, facilitating a replacement of the solenoid valve and the sensor assembly, and reducing maintenance costs.

The technical solution of the pneumatic high vacuum flapper valve disclosed by the present disclosure is:

An integration box, including:
a box body; and
a cover plate covering the box body,
an integration box chamber is formed between the box body and the cover plate, a solenoid valve and a sensor assembly are provided in the integration box chamber, one side of the integration box is provided with a through hole, an integration box air inlet pipeline and an integration box air outlet pipeline, the solenoid valve is communicated with an air outside the box body respectively through the integration box air inlet pipeline and the integration box air outlet pipeline, a trigger signal from the outside is sensed by the sensor assembly through the through hole, another side of the integration box is provided with an electrical connector, and the electrical connector can electrically connect the solenoid valve and the sensor assembly to the outside.

In an embodiment, the solenoid valve is provided with a solenoid valve air inlet hole and a solenoid valve air outlet hole, the integration box air inlet pipeline includes an integration box air inlet hole, the integration box air inlet hole is provided on one side of the box body, one end of the integration box air inlet pipeline is communicated with the solenoid valve air inlet hole, another end of the integration box air inlet pipeline is communicated with an outside air through the integration box air inlet hole, the integration box air outlet pipeline includes a sealing groove, the sealing groove is provided at a bottom of the box body, one end of the integration box air outlet pipeline is communicated with the solenoid valve air outlet hole, another end of the integration box air outlet pipeline is communicated with the outside air through the sealing groove, and a first sealing ring is installed in the sealing groove.

In an embodiment, one side of the box body is provided with an integration box exhaust pipeline, the integration box exhaust pipeline includes an integration box exhaust hole, the solenoid valve is provided with a solenoid valve exhaust hole, one end of the integration box exhaust pipeline is communicated with the solenoid valve exhaust hole, and another end of the integration box exhaust pipeline is communicated with the outside air through the integration box exhaust hole.

In an embodiment, the box body is provided with a base plate and side plates provided around the base plate, the solenoid valve is mounted on the base plate, the through hole is located at a center of the base plate, and the integration box air inlet pipeline and the integration box air outlet pipeline are respectively provided on the base plate.

In an embodiment, the electrical connector is installed on a side plate, and the side plate on a same side of the electrical connector is provided with at least one of a solenoid valve indicator light, a valve-opened sensor indicator light or a valve-closed sensor indicator light.

A pneumatic high vacuum flapper valve, including a cylinder assembly, a valve body and a valve plate assembly, the cylinder assembly includes a cylinder, a piston and a signal trigger rod, the piston is located in the cylinder, one side of the piston is connected with the valve plate assembly, a center of another side of the piston is connected with the signal trigger rod, the pneumatic high vacuum flapper valve includes the integration box, the signal trigger rod passes a through hole on the box body to perform a signal transmission with the sensor assembly, and the valve body is threadedly connected to the integration box.

In an embodiment, the sensor assembly includes one or two of a valve-opened sensor and a valve-closed sensor, the valve-opened sensor and the valve-closed sensor are microswitches, the signal trigger rod is provided with a signal trigger boss, the signal trigger boss can trigger the valve-closed sensor to output a signal that the valve is closed and trigger the valve-opened sensor to output a signal that the valve is opened.

In an embodiment, the sensor assembly includes one or two of a valve-opened sensor and a valve-closed sensor, the valve-opened sensor and the valve-closed sensor are magnetic switches, a permanent magnet is installed inside the signal trigger rod, and the permanent magnet can trigger the valve-closed sensor to output a signal that the valve is closed and trigger the valve-opened sensor to output a signal that the valve is opened.

In an embodiment, a center-sealed tube is provided in a box body of the integration box, one end of the center-sealed tube is communicated with the through hole, another end of the center-sealed tube is contact with the cover plate, an integration box chamber is formed between the box body, the center-sealed tube and the cover plate, the integration box chamber is filled with a constant temperature phase-change material (PCM), and a phase-change temperature of the constant temperature deformed material is between 25° C. to 40° C.

In an embodiment, the valve body is provided with a circular cylinder installation chamber, an outer wall of the cylinder is circular, and the cylinder is provided in the circular cylinder installation chamber.

The beneficial effects of the integration box disclosed by the present disclosure are as follows: an integration box air inlet pipeline is provided on the box body of the integration box to realize an air intake of the solenoid valve, an integration box air outlet pipeline is provided on the box body to realize a gas exchange between the solenoid valve and the pneumatic high vacuum flapper valve, and a through hole is provided on the box body to realize a connection between the sensor assembly and the pneumatic high vacuum flapper valve. Since the solenoid valve and the sensor assembly are centrally provided in the integration box, whether the solenoid valve or the sensor assembly fails, it only needs to replace the integration box, and no need for the professional after-sales personnel to the site to troubleshoot the solenoid valve and sensor assembly. Since the integration box is provided separated from the pneumatic high vacuum flapper valve, when the solenoid valve or sensor assembly in the integration box fails, it only needs to replace the integration box, and no need for the manufacturer to send the professional after-sales personnel to come to replace it, so it is convenient for the replacement of the solenoid valve and sensor assembly and reduces the maintenance costs of the pneumatic high vacuum flapper valve.

DETAILED DESCRIPTION OF THE EMBODIMENTS

The present disclosure will be described in more detail below with reference to the specific embodiments and the accompanying drawings.

First Embodiment

Figure 1:
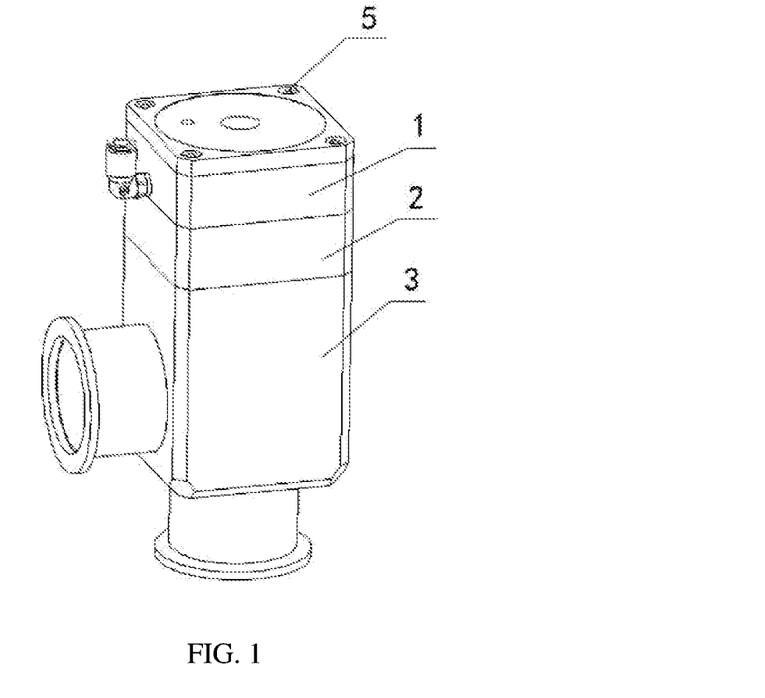
FIG. 1 is a schematic view of an integration box and a pneumatic high vacuum flapper valve according to the present disclosure.
Figure 2:
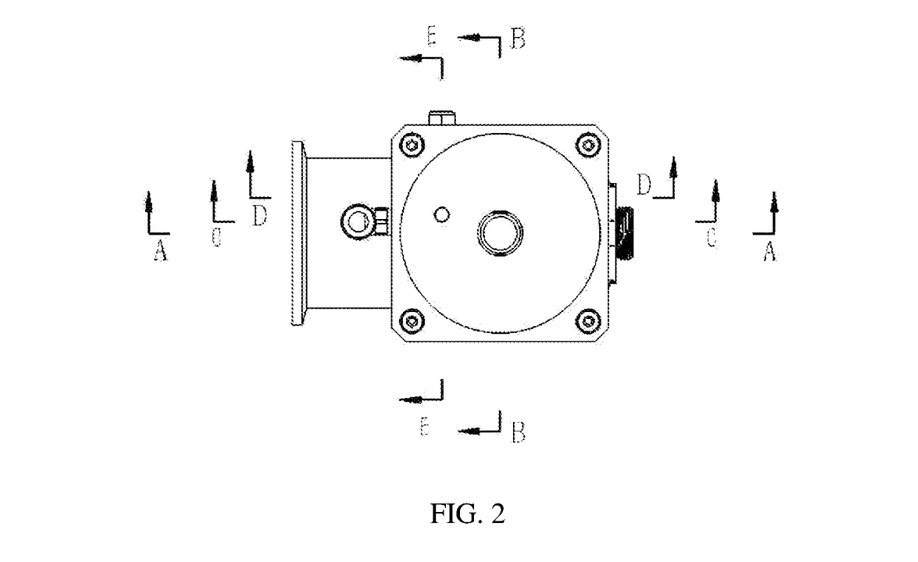
FIG. 2 is a top view of the integration box and the pneumatic high vacuum flapper valve according to the present disclosure.
Figure 10:
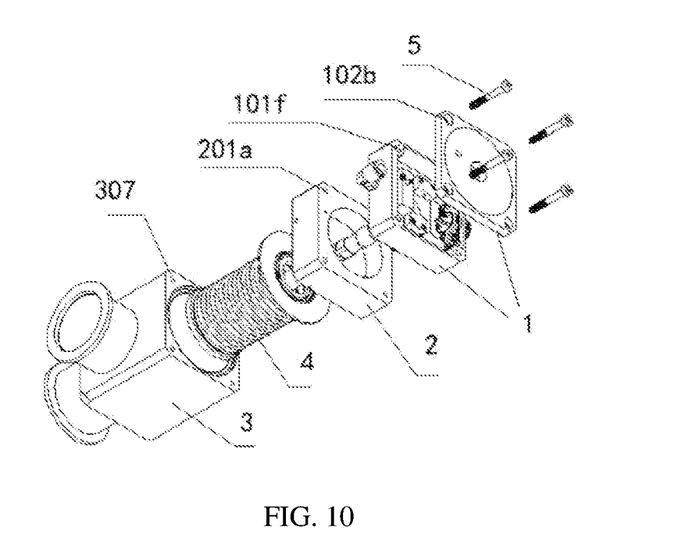
FIG. 10 is an exploded schematic view of the integration box and the pneumatic high vacuum flapper valve according to the present disclosure.

Referring to FIG. 1 and FIG. 10, an integration box 1, a cylinder assembly 2, a valve body 3, a valve plate assembly 4 are fixed together by four valve body fixing screws 5 respectively through four first cover plate fixing holes 102b, box body bottom plate fixing holes 101f, cylinder fixing holes 201a, and valve body screw fixing holes 307. A mechanism movement mode of the cylinder assembly 2, the valve body 3, and the valve plate assembly 4 is known, and will not be described in the present disclosure.

Figure 3:
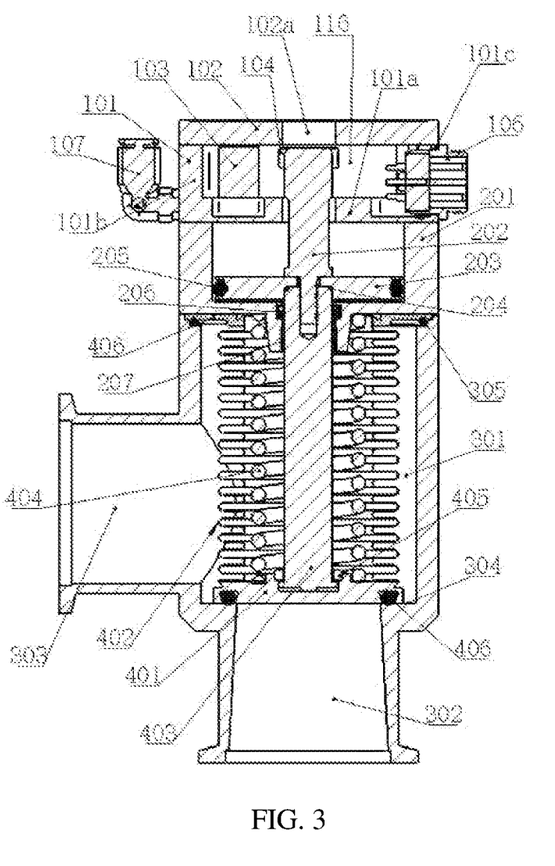
FIG. 3 is a sectional view along A-A in FIG. 2.
Figure 4:
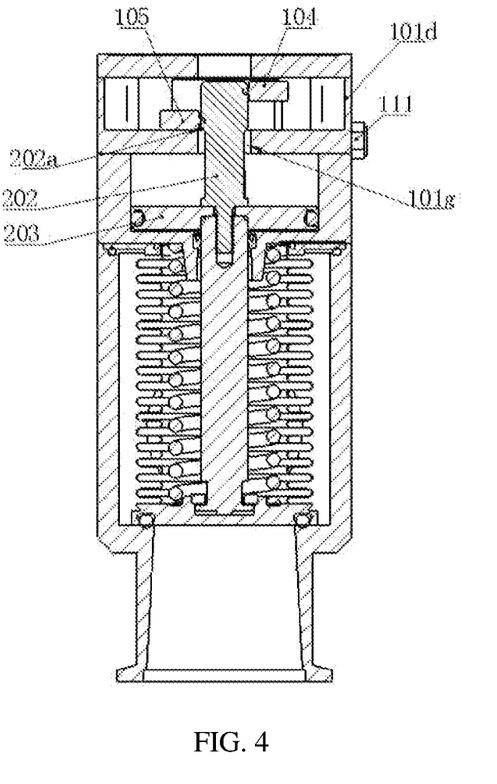
FIG. 4 is a sectional view along B-B in FIG. 2, in order to maintain a consistency of upper and lower position, the sectional view is rotated by 90 degrees, and following drawings of a same situation will not be described again.

Please refer to FIG. 3 and FIG. 4, an independent integration box 1 is added on an upper part of the cylinder assembly 2 in this embodiment, the integration box 1 is provided with a square box body 101 and a square cover plate 102, the box body 101 is provided with a box body bottom plate 101a, a first box body side plate 101b, a second box body side plate 101c, a third box body side plate 101d, and a fourth box body side plate 101e. A center of the box body bottom plate 101a is provided with a bottom plate central hole 101g, and four corners of the box body bottom plate 101a are provided with the four box body bottom plate fixing holes 101f. A center of the cover plate 102 is provided with a cover plate central hole 102a, and four corners of the cover plate 102 are provided with the four first cover plate fixing holes 102b. The cover plate 102 is installed on the box body 101, the box body 101, the cover plate 102 and an inner space form an integration box chamber 116, and the integration box chamber 116 is provided with a solenoid valve 103 and a sensor assembly. The solenoid valve 103 is installed on the box bottom plate 101a, the sensor assembly includes a valve-opened sensor 104 and a valve-closed sensor 105. As shown in FIG. 4, two sensors are installed nearby the box body bottom plate central hole 101g, the valve-opened sensor 104 is near the upper cover plate 102, and the valve-closed sensor 105 is near the lower box body bottom plate 101a. When the valve is opened, a signal is output by the valve-opened sensor 104, and when the valve is closed, the valve-closed sensor 105 outputs a signal (according to needs, the valve-opened sensor 104 or the valve-closed sensor 104 can be solely installed). An electrical connector 106 is installed on the second box body side plate 101c, an electrical lead of the sensor assembly and the solenoid valve 103 are connected to the electrical connector 106, and an external electrical signal is communicated through the electrical connector 106.

The solenoid valve 103 in the present disclosure can adopt a two-position with two-way or a two-position with three-way. The solenoid valve 103 of two-position with three-way includes a solenoid valve outlet hole 103a, a solenoid valve inlet hole 103b, and a solenoid valve exhaust hole 103c. The solenoid valve 103 of two-position with two-way only includes the solenoid valve outlet hole 103a and the solenoid valve inlet hole 103b, which vents to the integration box chamber 116 through the solenoid valve itself, and can exhaust through an opening on the cover plate 102 or one of the side plates of the box body 101. The solenoid valve 103 of two-position with two-way eliminates a process of an exhaust pipeline, and is simpler than the solenoid valve 103 of two-position with three-way. In this embodiment, only the solenoid valve 103 of two-position with three-way is taken account for illustration.

Figure 6:
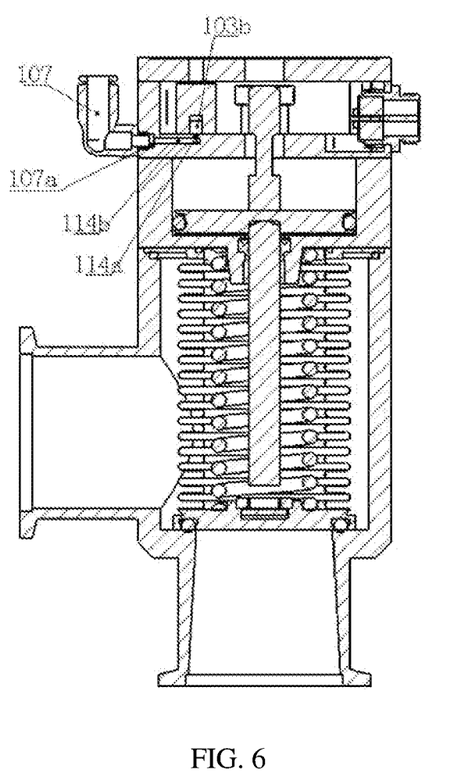
FIG. 6 is a sectional view along C-C in FIG. 2.

Please refer to FIG. 6, the box body bottom plate 101a is provided with an integration box air inlet pipeline 114 (i.e. a first air inlet hole 114a, a second air inlet hole 114b and an air inlet hole 107a), the air inlet pipe 107 includes the integration box air inlet hole 107a, the solenoid valve inlet hole 103b is connected to the integration box air inlet hole 107a through the first air inlet hole 114a and the second air inlet hole 114b, the integration box air inlet hole 107a is provided with a spiral structure, an air inlet connector 107 can be installed, and is connected to an external high-pressure gas pipeline through the air inlet connector 107.

Figure 7:
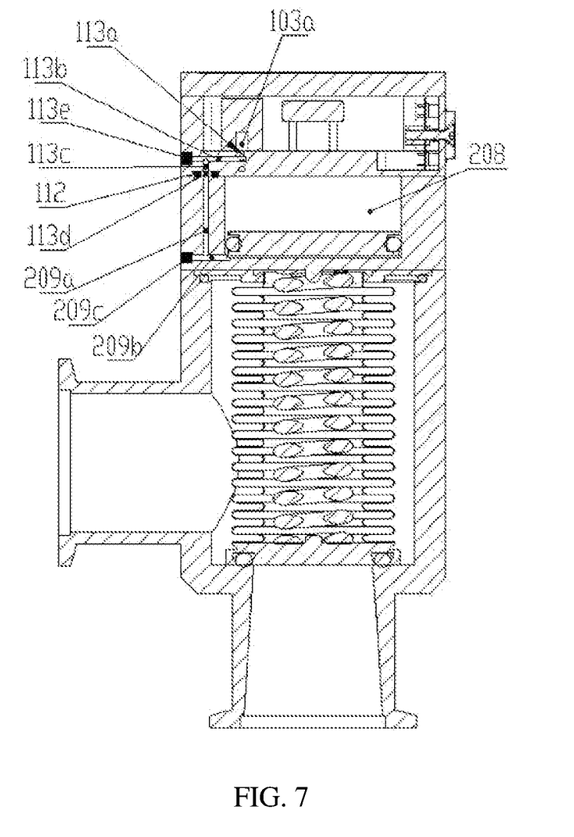
FIG. 7 is a sectional view along D-D in FIG. 2.

Please refer to FIG. 7, an integration box air outlet pipeline 113 (i.e., a first air outlet hole 113a, a second air outlet hole 113b and a third air outlet hole 113c). A first pipe plug 113e is required for sealing the integration box air outlet pipeline 113 as shown in FIG. 7. A sealing groove 113d is also processed at a lower part of the box body bottom plate 101a. The solenoid valve outlet hole 103a is connected to the sealing groove 113d through the first air outlet hole 113a, the second air outlet hole 113b and the third air outlet hole 113c. A cylinder body 201 in the cylinder assembly 2 is provided with a cylinder body outlet pipeline 209 (i.e., a first cylinder body outlet hole 209a and a second cylinder body outlet hole 209b). The second cylinder body outlet hole 209b is connected to a bottom of a cylinder chamber 208, and a second pipe plug 209c is also required for sealing the cylinder body outlet pipeline 209 as shown. The sealing groove 113d is connected to the cylinder chamber 208 in the cylinder assembly 2 through the first cylinder body outlet hole 209a and the second cylinder body outlet hole 209b. A first sealing ring 112 is installed inside the sealing groove 113d, it's sealed between the sealing groove 113d and the cylinder body outlet hole 209a through the first sealing ring 112, and a closed air circuit is formed.

Figure 8:
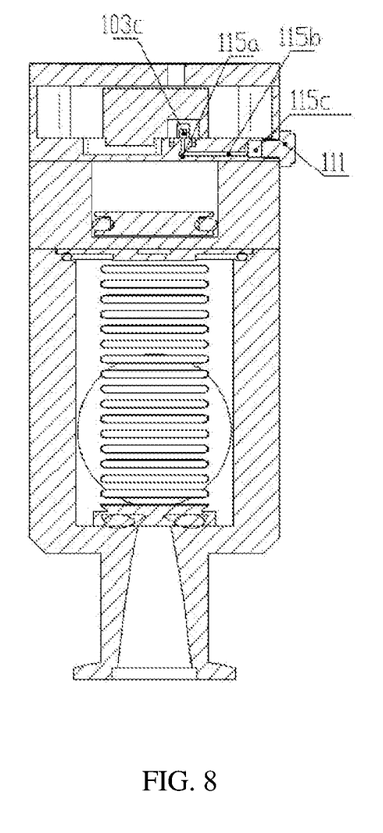
FIG. 8 is a sectional view along E-E in FIG. 2.

Please refer to FIG. 8, an integration box exhaust pipeline 115 (i.e., a first exhaust hole 115a, a second exhaust hole 115b and an integration box exhaust hole 115c). The solenoid valve exhaust hole 103c vents through the first exhaust hole 115a, the second exhaust hole 115b and the integration box exhaust hole 115c. The integration box exhaust hole 115c is provided with a screw structure, and a muffler 111 can be installed to reduce an exhaust noise.

Please refer to FIG. 3, when the solenoid valve 103 is opened, the solenoid valve exhaust hole 103c is in a closed state, the solenoid valve inlet hole 103b is communicated with the solenoid valve outlet hole 103a, and the external high-pressure gas passes through the air inlet connector 107, the integration box air inlet hole 107a, the first air inlet hole 114a, the second air inlet hole 114b, the solenoid valve air inlet hole 103b, the solenoid valve air outlet hole 103a, the first air outlet hole 113a, the second air outlet hole 113b, the third air outlet hole 113c, the sealing groove 113d, the first cylinder air outlet 209a and the second cylinder outlet hole 209b provide the high-pressure gas to the cylinder chamber 208 and drive a piston 203 to move upward to a top of the cylinder chamber 208, and the valve is opened.

When the solenoid valve 103 is closed, the solenoid valve air inlet hole 103b is in a closed state, the solenoid valve exhaust hole 103c is communicated with the solenoid valve air outlet hole 103a. The high-pressure gas in the cylinder chamber 208 is exhausted respectively through the second cylinder body outlet hole 209b, the first cylinder body outlet hole 209a, the sealing groove 113d, the third air outlet hole 113c, the second air outlet 113b, the first air outlet hole 113a, the solenoid valve air outlet hole 103a, the solenoid valve exhaust hole 103c, the first exhaust hole 115a, the second exhaust hole 115b, the integration box exhaust hole 115c, and the muffler 111. The piston 203 returns to the bottom of the cylinder chamber 208 through a spring pressure provided by a spring 404, and the valve is closed.

Figure 13:
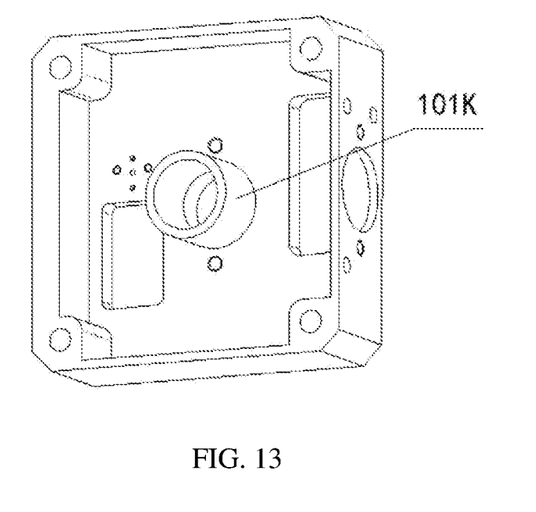
FIG. 13 is a schematic view when a center-sealed tube is provided in the box body of the integration box and the pneumatic high vacuum flapper valve according to the present disclosure.
Figure 14:
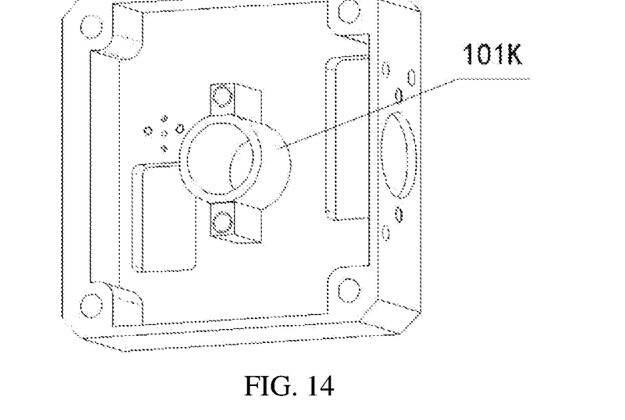
FIG. 14 is a schematic view when another center-sealed tube is provided in the box body of the integration box and the pneumatic high vacuum flapper valve according to the present disclosure.

Please refer to FIG. 4 and FIG. 13, the sensor assembly is a micro switch, a signal trigger rod 202 is installed at a center above the piston 203, the signal trigger rod 202 is provided with a signal trigger boss 202a, and pierces through the bottom plate central hole 101g. When the valve is closed, the signal trigger boss 202a is under the valve-closed sensor 105, and the valve-closed sensor 105 outputs an electrical signal that the valve is closed. When the valve is opened, the piston 203 moves to a top of the cylinder chamber 208, the signal trigger rod 202 moves upward together with the piston 203, the signal trigger boss 202a triggers the valve-closed sensor 105 and the valve-opened sensor 104, and a signal that the valve is opened is output by the valve-opened sensor 104. When the pressure in the cylinder chamber is insufficient, the piston 203 only moves to a middle of the cylinder chamber 208, the signal trigger boss 202a only triggers the valve-closed sensor 105, and this kind of signal can be an information that the air source pressure provided from the outside is insufficient.

When the signal trigger rod 202 is long enough, the signal trigger rod 202 will pierce through the cover plate central hole 102a after the valve is opened, which can be a mechanical indication signal that the valve is opened. When the signal trigger rod 202 is designed to be relatively short, the cover plate central hole 102a is not required.

Figure 9:
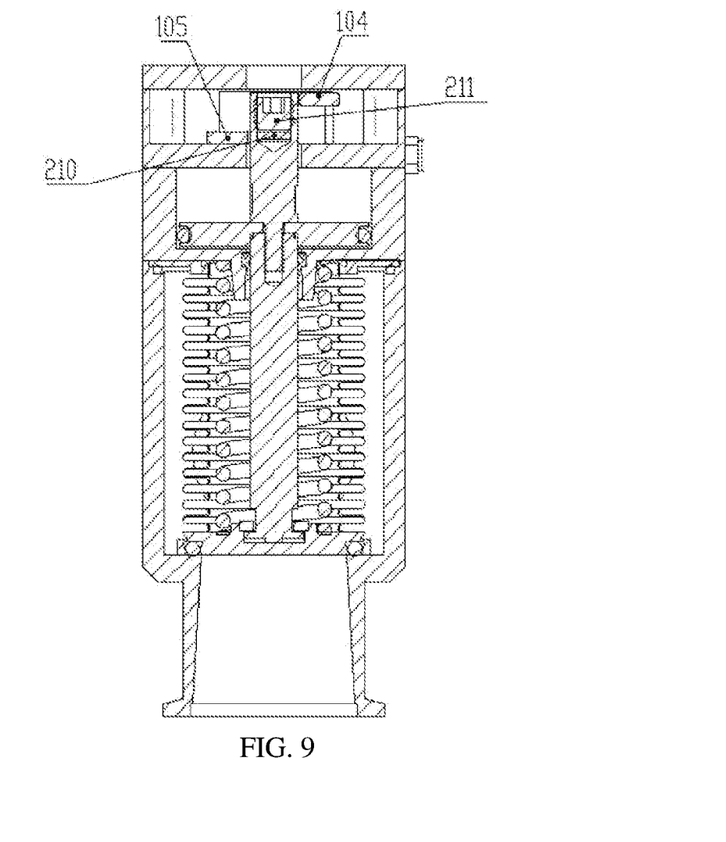
FIG. 9 is a schematic view when a sensor assembly is a magnetic switch according to the present disclosure.

In this embodiment, the sensor assembly can also be a magnetic switch (this technical solution is no longer described as a separate embodiment). The sensor assembly is the magnetic switch, an upper part of the signal trigger rod 202 is provided with a digging hole with a screw, the digging hole is provided with a permanent magnet permanent magnet 210, the permanent magnet 210 is fixed through permanent magnet fixing screw 211, and the permanent magnet 210, as a substitute of the signal trigger boss 202a, is a signal trigger device of the sensor assembly. When the valve is closed, the permanent magnet 210 triggers the valve-closed sensor 105, and the valve-closed sensor 105 outputs the electrical signal that the valve is closed. When the valve is opened, the piston 203 moves to the top of the cylinder chamber 208, the permanent magnet 210 triggers the valve-opened sensor 104, and the valve-opened sensor 104 outputs the signal that the valve is opened.

Figure 11:
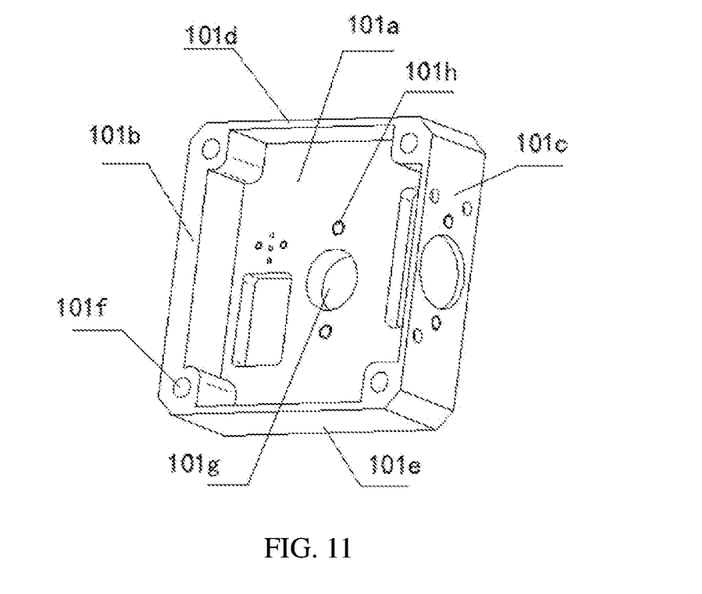
FIG. 11 is a schematic view of a box body of the integration box and the pneumatic high vacuum flapper valve according to the present disclosure.
Figure 12:
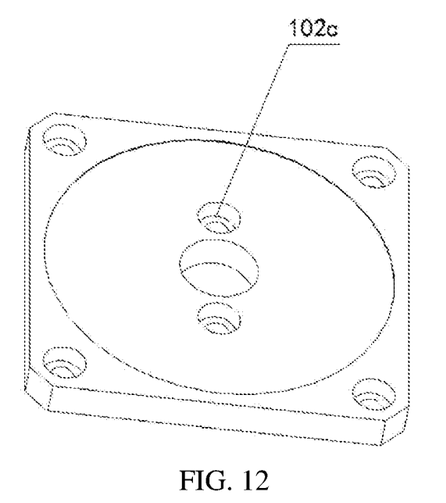
FIG. 12 is a schematic view of a cover plate of the integration box and the pneumatic high vacuum flapper valve according to the present disclosure.

Please refer to FIGS. 11 and 12, in this embodiment, the box body 101 and the cover plate 102 can also be fixed together by screws to form an integrity which is no longer separated (this technical solution is no longer described as a separate embodiment), two cover plate fixing screw holes 101h are processed by the box body bottom plate 101a, two second cover plate fixed holes 102c are processed on the cover plate 102, two fixing screws pierce through the two second cover plate fixed holes 102c and are fixed in the two cover plate fixing screw holes 101h, the box body 101 and the cover plate 102 form the integrity which is no longer separated. At least one cover plate fixing screw hole 101h and at least one second cover plate fixed hole 102c are provided, an amount of which is two in this embodiment.

Figure 5:
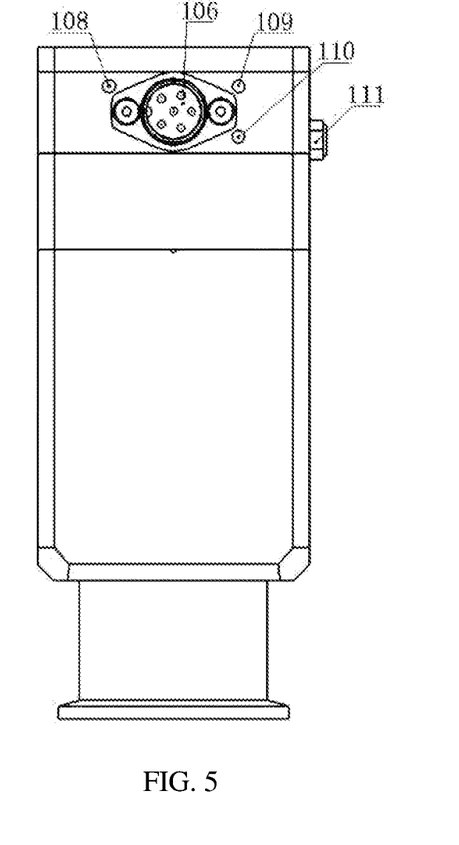
FIG. 5 is a right side view of the pneumatic high vacuum flapper valve according to the present disclosure.

Please refer to FIG. 5, the second box body side plate 101c in this embodiment is also provided with a solenoid valve indicator light 108, a valve-opened solenoid valve indicator light 109 and a valve-closed sensor indicator light 110.

In this embodiment, the integration box air outlet pipeline 113, the integration box air inlet pipeline 114 and the integration box exhaust hole 115c can also be processed into different distribution pipeline forms, a straight pipeline can also be replaced by an inclined hole. The integration box air inlet hole 107a and the integration box exhaust hole 115c can also be distributed on different side plates of the box body, different professional and technical personnel can design different gas pipeline distribution methods, thus the present disclosure is not limited to the distribution of pipelines illustrated in in this embodiment.

The principle and the structure of the present disclosure are shown in the description and accompanying drawings in this embodiment. In order to save a space, some simple variants are no longer set forth as new embodiments, thus the present disclosure is not limited to this embodiment, any equivalent modifications made to a certain extent based on this embodiment shall fall within the scope of the present disclosure. Therefore, the scope of the present disclosure should be based on the appended claims.

Second Embodiment

Please refer to FIG. 1, and FIGS. 11 to 13, in the first embodiment, when the sensor assembly is the magnetic switch, a center-sealed tube 101k is added at the center of the box body bottom plate 101a of the box body 101, an upper edge of the center-sealed tube 101k is flush with the side plate of the box body. When the cover plate 102 is installed on the box body 101, the integration box 1 is made to form a closed integration box chamber 116 by the center-sealed tube 101k, a hole is provided at a center of the center-sealed tube 101k, an inner diameter of which is equal to that of the bottom plate central hole 101g. The hole, the bottom plate central hole 101g, and the cover plate central hole 102a get together to form a hole for the signal trigger rod 202 piercing through. The sensor assembly is isolated from the signal trigger rod 202 by the center-sealed tube 101k, a micro switch type sensor assembly is not available in this embodiment, so the sensor assembly in this embodiment can only be the magnetic switch.

In this embodiment, the solenoid valve 103 can only be the two-position with three-way, because the sealed integration box chamber 116 cannot provide an exhaust function for the solenoid valve 103, but an exhaust hole is required for the solenoid valve 103, and the solenoid valve 103 vents through the integration box exhaust hole 115 in the box body bottom plate 101a.

In this embodiment, the box body 101 and the cover plate 102 need to be fixed together through screws to form the integrity which is no longer separated.

The sealed integration box chamber 116 is filled with a constant temperature phase-change material (PCM), the constant temperature PCM can be a phase-change paraffin or a phase-change micro capsule, and a phase-change temperature of the constant temperature PCM is preferably to be 25-40° C. A large amount of heat can be absorbed by the phase-change temperature of the constant temperature PCM. When the solenoid valve 103 works for a long time, a heat generated by the solenoid valve 103 is absorbed by the constant temperature PCM and dissipated through an outer wall of the integration box 1. A temperature of the solenoid valve 103 can always be kept at the phase-change temperature of the constant temperature PCM. A main reason for a failure of a solenoid valve coil is that the temperature of the solenoid valve 103 itself is high because the solenoid valve 103 works for a long time. When an ambient temperature is relatively high, the solenoid valve 103 may excess an allowable working temperature, and the solenoid valve 103 is easy to overheat and fail. Adding the constant temperature PCM in the sealed integration box reduces the temperature of the solenoid valve 103 and reduces a failure frequency of the solenoid valve 103.

When a first flange 302 or a second flange 303 temporarily works on a high-temperature equipment, or when the first flange 302 and the second flange 303 need to temporarily transmit the high-temperature gas, the constant temperature PCM can significantly extend a period of this temporary high-temperature operation.

Please refer to FIG. 13, which shows another structure of the center-sealed tube 101k.

Third Embodiment

Figure 15:
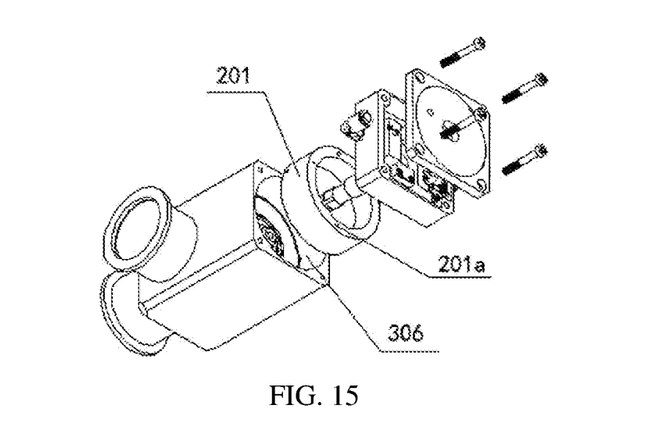
FIG. 15 is an exploded schematic view of the integration box and the pneumatic high vacuum flapper valve according to a third embodiment of the present disclosure.

Please refer to FIG. 15, the cylinder in existing pneumatic high-vacuum flapper valve is all fixed on the valve body by bolts, such as patents US20150285382A1, US20070007475A1, US20060266962A1, US20050006610A1, etc. All this kind of cylinder is a square cylinder, so that the square cylinder can be fixed on the valve body by bolts at four corners of the square cylinder. A lathe is required to process the cylinder chamber of the square cylinder, and a miller is required to process a square outer wall of the square cylinder, which results in an increase in cylinder processing costs. The valve body and the cylinder body in the first and second embodiments are all traditional structures. A difference between this embodiment and the first and second embodiments is that the upper part of the valve body 3 is provided with a round cylinder installation chamber 306, an outer wall of the cylinder body 201 is also a circular structure instead of the traditional square outer wall, and the cylinder body 201 is not provided with the cylinder fixing hole 201a. The cylinder body 201 is fixed in the cylinder installation chamber 306 through the integration box, with no need of screw fixing, which eliminates the process of the square outer wall by the miller, only the lathe process is required to complete the whole processing, and the processing cost is relatively low. The valve body 3 is manufactured through integrated molding technologies such as a forging or a die-casting, an increased cost is very few, thereby reducing an overall cost of the pneumatic high vacuum flapper valve.

Figure 16:
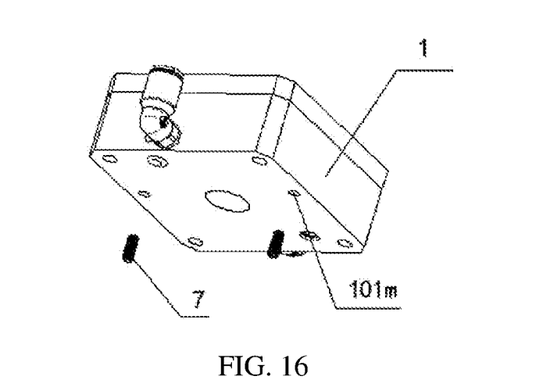
FIG. 16 is a schematic view of the integration box and a positioning pin of the integration box and the pneumatic high vacuum flapper valve according to the present disclosure.

Please refer to FIGS. 11, 15, and 16, the cylinder body 201 can be provided in the cylinder installation chamber 306 of the valve body 3, and the upper edge of the cylinder body 201 is flush with the upper edge of the cylinder installation chamber 306. When the integration box 1 is installed on the valve body 3, the cylinder body 201 is tightly pressed in the cylinder installation chamber 306 by the box body bottom plate 101a of the box body 101, and a preload force for the cylinder body 201 is provided by a fifth sealing ring 305.

The cylinder body 201 in this embodiment can rotate freely, a position of the 209a on the cylinder body 201 is also in an unfixed state, the integration box air outlet pipeline 113*d* at the bottom of the box body bottom plate 101*a* is in a fixed position, because the 209*a* needs to be at a same position as the integration box air outlet pipeline 113*d*, a positioning mechanism needs to be added between the cylinder body 201 and the box body bottom plate 101*a* so that the position of the two are relatively fixed. The cylinder body 201 is provided with two cylinder fixing holes 201*a* (at least one cylinder positioning hole), as shown in FIG. 7, the box body bottom plate 101*a* is provided with two box body bottom plate positioning holes 101*m* (at least one box bottom plate positioning hole), two positioning pins 7 are used for positioning between the two box body bottom plate positioning holes 101*m* and the two cylinder fixing holes 201*a*, and the first cylinder body air outlet hole 209*a* and the sealing groove 113*d* are in a same position during an installation, so that a communication of the outlet pipeline is guaranteed. The cylinder body 201 and the box body bottom plate 101*a* can also be directly fixed together by screws, and the specific method is easy to implement, which will not be described in this embodiment.

To sum up, integrating the solenoid valve 103 and the sensor assembly in the integration box 1 facilitates the replacement of the solenoid valve 103 and the sensor assembly. At the same time, the integration box can also be designed to be a sealed form and filled with the constant temperature PCM, which significantly improves a life of the solenoid valve 103 and improves a temperature resistance of the pneumatic high vacuum flapper valve. An air inlet structure provided with the integration box allows the cylinder body 201 to be designed as a structure provided inside the valve body 3, which reduces a machining process of the cylinder body 201 and reduces the cost of the pneumatic high vacuum flapper valve.

Finally, it should be noted that the above embodiments are only used to illustrate the technical solutions of the present disclosure, rather than to limit the scope of the present disclosure, although the present disclosure is described in detail with reference to the preferable embodiments, persons skilled in the art should understand, the technical solution of the present disclosure may be modified or equivalently replaced without departing from the scope of the technical solution of the present disclosure.

What is claimed is:

1. An integration box, comprising:
a box body; and
a cover plate covering the box body,
wherein an integration box chamber is formed between the box body and the cover plate, a solenoid valve and a sensor assembly are provided in the integration box chamber, one side of the integration box is provided with a through hole, an integration box air inlet pipeline and an integration box air outlet pipeline, the solenoid valve is communicated with an air outside the box body respectively through the integration box air inlet pipeline and the integration box air outlet pipeline, a trigger signal from the outside is sensed by the sensor assembly through the through hole, another side of the integration box is provided with an electrical connector, and the electrical connector is configured to electrically connect the solenoid valve and the sensor assembly to the outside; and
the solenoid valve is provided with a solenoid valve air inlet hole and a solenoid valve air outlet hole, the integration box air inlet pipeline comprises an integration box air inlet hole, the integration box air inlet hole is provided on one side of the box body, one end of the integration box air inlet pipeline is communicated with the solenoid valve air inlet hole, another end of the integration box air inlet pipeline is communicated with an outside air through the integration box air inlet hole, the integration box air outlet pipeline comprises a sealing groove, the sealing groove is provided at a bottom of the box body, one end of the integration box air outlet pipeline is communicated with the solenoid valve air outlet hole, another end of the integration box air outlet pipeline is communicated with the outside air through the sealing groove, and a first sealing ring is installed in the sealing groove.

2. The integration box of claim 1, wherein one side of the box body is provided with an integration box exhaust pipeline, the integration box exhaust pipeline comprises an integration box exhaust hole, the solenoid valve is provided with a solenoid valve exhaust hole, one end of the integration box exhaust pipeline is communicated with the solenoid valve exhaust hole, and another end of the integration box exhaust pipeline is communicated with the outside air through the integration box exhaust hole.

3. The integration box of claim 1, wherein the box body is provided with a base plate and side plates provided around the base plate, the solenoid valve is mounted on the base plate, the through hole is located at a center of the base plate, and the integration box air inlet pipeline and the integration box air outlet pipeline are respectively provided on the base plate.

4. The integration box of claim 1, wherein the electrical connector is installed on a side plate, and the side plate on a same side of the electrical connector is provided with at least one of a solenoid valve indicator light, a valve-opened sensor indicator light or a valve-closed sensor indicator light.

5. A pneumatic high vacuum flapper valve, comprising a cylinder assembly, a valve body and a valve plate assembly, the cylinder assembly comprises a cylinder, a piston and a signal trigger rod, the piston is located in the cylinder, one side of the piston is connected with the valve plate assembly, a center of another side of the piston is connected with the signal trigger rod,
wherein the pneumatic high vacuum flapper valve comprises the integration box of claim 1, the signal trigger rod passes a through hole on the box body to perform a signal transmission with the sensor assembly, and the valve body is threadedly connected to the integration box.

6. The pneumatic high vacuum flapper valve of claim 5, wherein the sensor assembly comprises one or two of a valve-opened sensor and a valve-closed sensor, the valve-opened sensor and the valve-closed sensor are microswitches, the signal trigger rod is provided with a signal trigger boss, the signal trigger boss is configured to trigger the valve-closed sensor to output a signal that the valve is closed and trigger the valve-opened sensor to output a signal that the valve is opened.

7. The pneumatic high vacuum flapper valve of claim 5, wherein the sensor assembly comprises one or two of a valve-opened sensor and a valve-closed sensor, the valve-opened sensor and the valve-closed sensor are magnetic switches, a permanent magnet is installed inside the signal trigger rod, and the permanent magnet is configured to trigger the valve-closed sensor to output a signal that the valve is closed and trigger the valve-opened sensor to output a signal that the valve is opened.

8. The pneumatic high vacuum flapper valve of claim 5, wherein the valve body is provided with a circular cylinder installation chamber, an outer wall of the cylinder is circular, and the cylinder is provided in the circular cylinder installation chamber.

\* \* \* \* \*